(12) United States Patent
Giesmann

(10) Patent No.: US 9,994,159 B2
(45) Date of Patent: Jun. 12, 2018

(54) MULTI-POSITION STAIR ASSEMBLY FOR WORK VEHICLES

(71) Applicant: Deere & Company, Moline, IL (US)

(72) Inventor: Kendall L. Giesmann, Waverly, IA (US)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 15/056,706

(22) Filed: Feb. 29, 2016

(65) Prior Publication Data

US 2017/0246992 A1    Aug. 31, 2017

(51) Int. Cl.
  *E06C 5/24*    (2006.01)
  *B60R 3/02*    (2006.01)
  *B62D 49/06*   (2006.01)

(52) U.S. Cl.
  CPC .................. *B60R 3/02* (2013.01); *E06C 5/24* (2013.01); *B62D 49/06* (2013.01)

(58) Field of Classification Search
  CPC ..................................... E06C 5/24; B60R 3/02
  See application file for complete search history.

(56) References Cited

U.S. PATENT DOCUMENTS

| | | | | |
|---|---|---|---|---|
| 2,933,149 A * | 4/1960 | Lee | ............................ | B64C 1/24 14/71.5 |
| 2,990,148 A * | 6/1961 | James | ....................... | B64C 1/24 182/127 |
| 3,869,022 A * | 3/1975 | Wallk | ........................ | E02F 9/00 182/207 |
| 3,871,479 A * | 3/1975 | Pelto | ......................... | A62B 5/00 182/106 |
| 4,002,223 A | 1/1977 | Bemkrant | | |
| 4,079,815 A * | 3/1978 | Cormier | .................... | B60R 3/02 182/195 |
| 4,119,177 A | 10/1978 | Anderson | | |
| 4,586,585 A * | 5/1986 | Zaner | .................... | E04F 11/025 182/206 |
| 5,143,324 A * | 9/1992 | Cornelius | ................. | B64C 1/24 182/88 |
| 7,857,337 B2 * | 12/2010 | Ferguson | .................. | B60R 3/02 182/127 |
| 7,905,324 B2 * | 3/2011 | Gil | ............................ | B60R 3/02 182/127 |

(Continued)

OTHER PUBLICATIONS

John Deere, Self-Propelled Sprayers, R4045 Sprayer Product Brochure, Jun. 2014.

(Continued)

*Primary Examiner* — Colleen M Chavchavadze
(74) *Attorney, Agent, or Firm* — Lorenz & Kopf, LLP

(57) ABSTRACT

A stair assembly for a work vehicle includes a stepped support and an actuator. The stepped support has one or more steps mountable to a side of the work vehicle. The stepped support is moveable by the actuator between a retracted orientation, in which the stepped support has a first length between first and second ends, and an extended orientation, in which the support structure has a greater length. When mounted to the work vehicle, the second end of the stepped support is at an outward lowered position in the extended orientation with respect to the work vehicle relative to an inward raised position of the second end of the stepped support in the retracted orientation.

19 Claims, 5 Drawing Sheets

(56) References Cited

U.S. PATENT DOCUMENTS

| | | | |
|---|---|---|---|
| 8,002,298 B2 * | 8/2011 | Casbolt | B60R 3/02 |
| | | | 280/163 |
| 8,074,768 B2 * | 12/2011 | Rund | B60R 3/02 |
| | | | 182/127 |
| 8,251,178 B2 * | 8/2012 | Krobot | B60R 3/02 |
| | | | 182/127 |
| 8,316,595 B2 * | 11/2012 | Burford | E04F 11/068 |
| | | | 52/183 |
| 8,336,825 B2 * | 12/2012 | Meyer-Rusitschka | B64C 1/24 |
| | | | 182/106 |
| 8,668,216 B2 * | 3/2014 | Ellement | E06C 5/28 |
| | | | 182/127 |
| 8,919,497 B2 * | 12/2014 | Rund | B60R 3/02 |
| | | | 182/127 |
| 9,222,306 B2 * | 12/2015 | Appling | E06C 5/24 |
| 9,447,638 B2 * | 9/2016 | Hedley | E06C 1/393 |
| 9,539,948 B1 * | 1/2017 | Presley | B60R 3/02 |
| 2003/0173153 A1 * | 9/2003 | Hedley | B63B 27/14 |
| | | | 182/97 |
| 2009/0065301 A1 * | 3/2009 | Ellement | B60R 3/02 |
| | | | 182/127 |
| 2013/0048400 A1 * | 2/2013 | Holdener | B60R 3/02 |
| | | | 180/89.1 |
| 2013/0092474 A1 * | 4/2013 | Magnussen | E06C 5/36 |
| | | | 182/127 |
| 2016/0101738 A1 * | 4/2016 | Iotti | E06C 1/393 |

OTHER PUBLICATIONS

Agco, Challenger MT800E Series Product Brochure, Admitted Prior Art.

\* cited by examiner

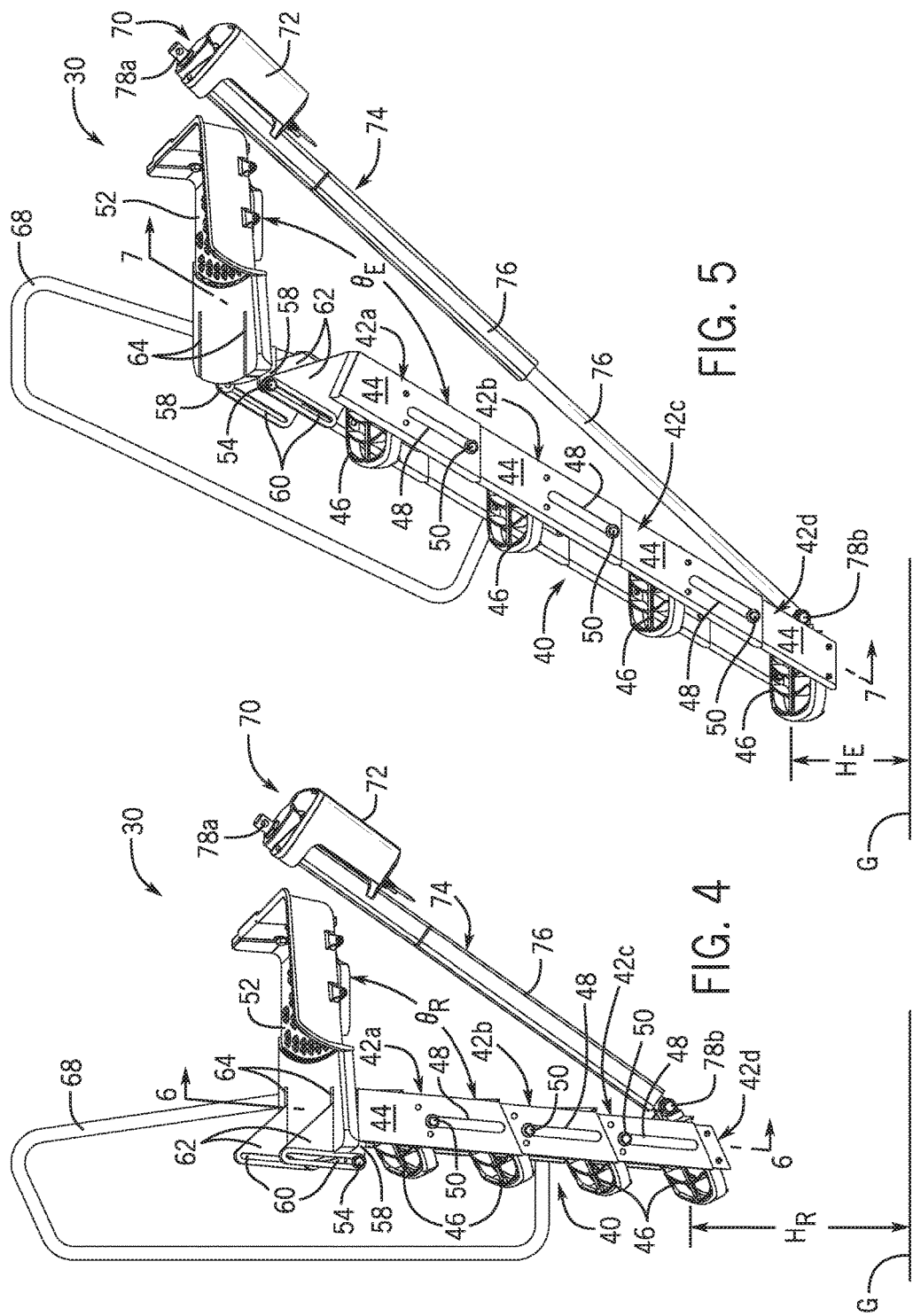

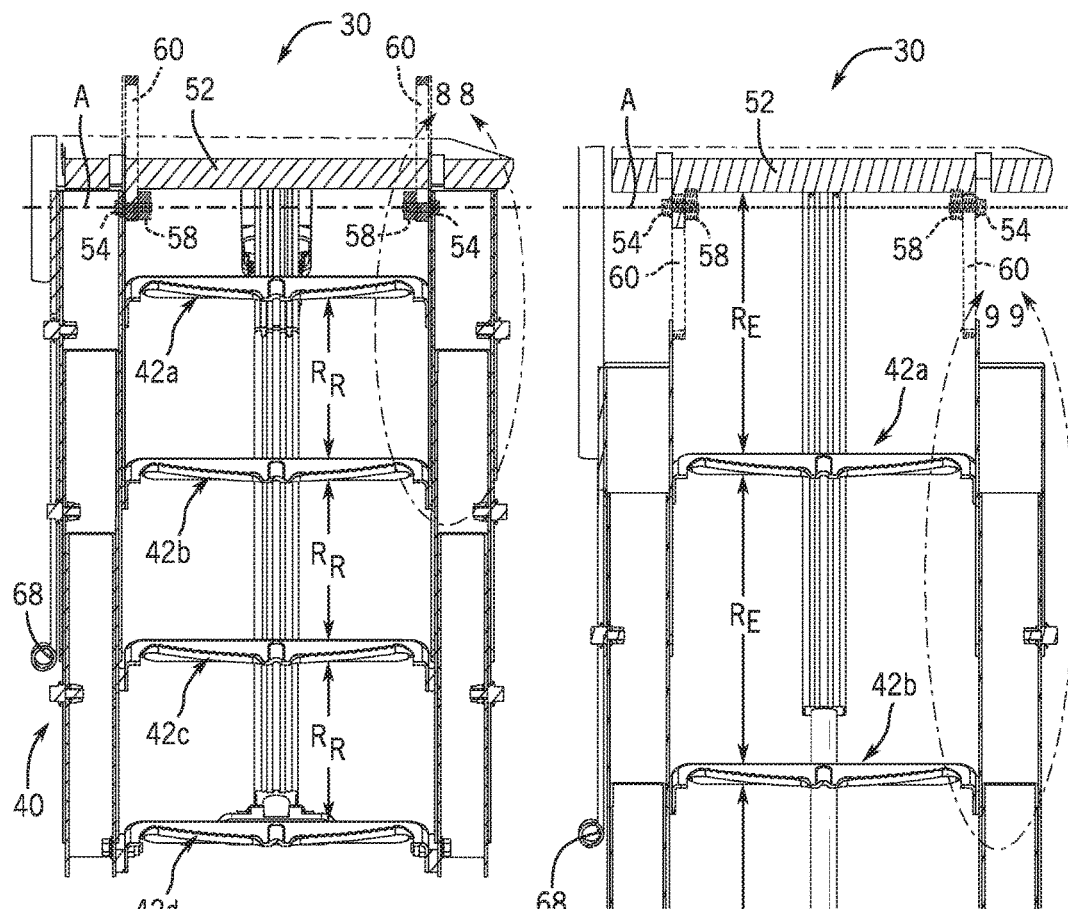

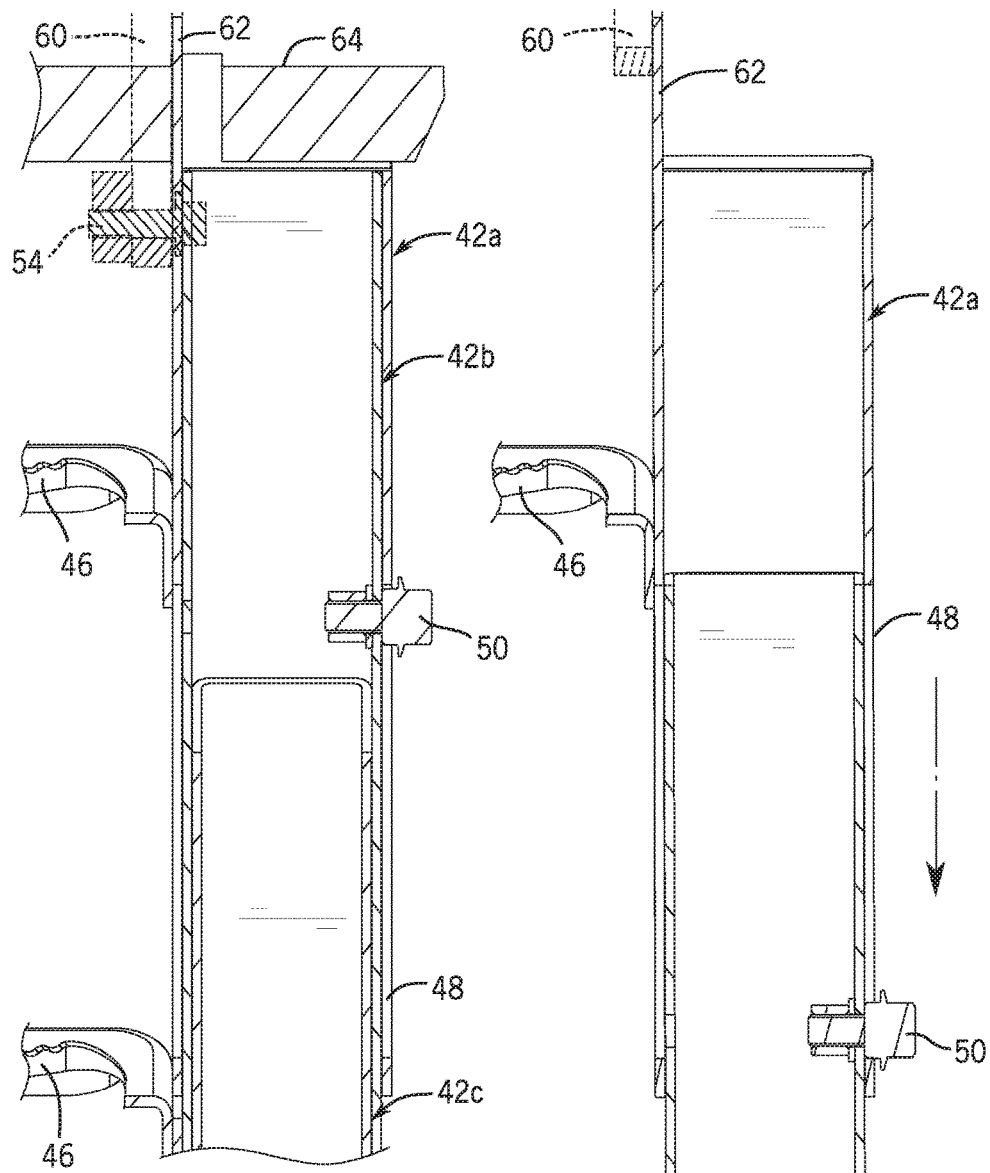

MULTI-POSITION STAIR ASSEMBLY FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and specifically to stair assemblies for work vehicles.

BACKGROUND OF THE DISCLOSURE

Large work vehicles, such as those used in the agriculture, construction, forestry and mining industries, may have one or more steps or stairs for an operator of the machine to gain entry into the operator cabin or for a service technician to gain access to the engine compartment or other elevated components of the machine. Various factors (e.g., ground clearance requirements and height and width regulations of such work vehicles) may restrict the placement and overall size of such steps or stairs. The relative size and configuration of the steps (e.g., the vertical rise between adjacent steps and the distance from the ground to the lowest step) may also be restricted by various factors, including certain human factor and ergonomic considerations and/or regulations.

SUMMARY OF THE DISCLOSURE

This disclosure provides a stair assembly for a work vehicle, such as for operator cabin ingress and egress, that may be positioned in multiple orientations.

In one aspect the disclosure provides a stair assembly for a work vehicle having a stepped support and an actuator. The stepped support has a first step and is configured to be mounted at a first end to a side of the work vehicle. The stepped support is moveable by the actuator between a retracted orientation, in which the stepped support has a first length between the first end and a second end, and an extended orientation, in which the stepped support has a second length between the first and second ends that is greater than the first length. When the stepped support is mounted to the work vehicle, the second end of the stepped support is at an outward lowered position in the extended orientation with respect to the work vehicle relative to an inward raised position of the second end of the stepped support in the retracted orientation.

In another aspect the disclosure provides a stair assembly for a work vehicle again having a stepped support and an actuator. The stepped support has a plurality of steps configured to be mounted at a first end to a side of the work vehicle. The stepped support is moveable by the actuator between a retracted orientation, in which the stepped support has a first length between the first end and a second end, and an extended orientation, in which the stepped support has a second length between the first and second ends that is greater than the first length. When the stepped support is mounted to the work vehicle, the second end of the stepped support is at an outward lowered position in the extended orientation with respect to the work vehicle relative to an inward raised position of the second end of the stepped support in the retracted orientation. The steps are mounted to the stepped support such that consecutive steps are separated by substantially (i) a first step rise when the stepped support is in the retracted orientation, (ii) a second step rise that is larger than the first step rise when the stepped support is in the extended orientation.

In yet another aspect the disclosure provides a work vehicle having a chassis supported by ground-engaging wheels or tracks, an operator cabin supported by the chassis, and a stair assembly for operator ingress and egress to the operator cabin. The stair assembly includes a stepped support and an actuator. The stepped support has a first step and is pivotally mounted at a first end to a side of the work vehicle. The stepped support is pivoted and translated by the actuator between a retracted orientation, in which the stepped support has a first length between the first end and a second end, and an extended orientation, in which the stepped support has a second length between the first and second ends that is greater than the first length. The second end of the stepped support is at an outward lowered position in the extended orientation with respect to the work vehicle relative to an inward raised position of the second end of the stepped support in the retracted orientation.

The details of one or more embodiments are set forth in the accompanying drawings and the description below. Other features and advantages will become apparent from the description, the drawings, and the claims.

BRIEF DESCRIPTION OF THE DRAWINGS

FIGS. 4 and 5 are perspective views of the stair assembly, shown in isolation in respective retracted and extended orientations;

FIGS. 6 and 7 are sectional views thereof taken along planes 6-6 and 7-7 of FIGS. 4 and 5, respectively; and FIGS. 8 and 9 are partial sectional views showing respective areas 8-8 and 9-9 thereof.

Like reference symbols in the various drawings indicate like elements.

DETAILED DESCRIPTION

Figure 1:
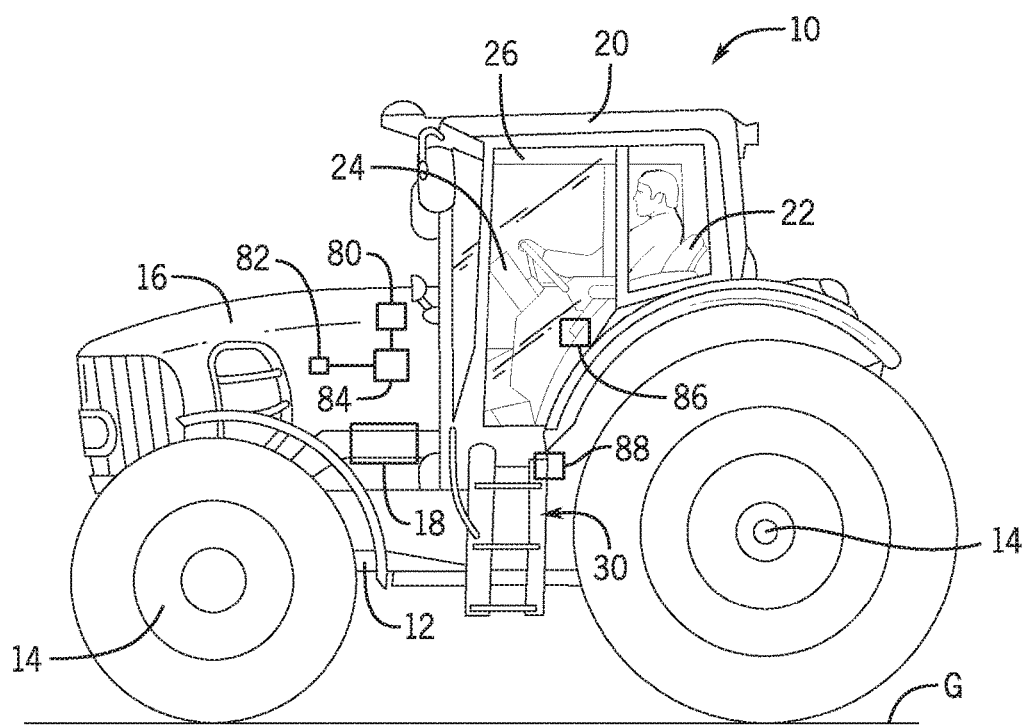
FIG. 1 is a side view of an example work vehicle showing a multi-position stair assembly according to this disclosure.

The following describes one or more example embodiments of the disclosed work vehicle stair assembly, as shown in the accompanying figures of the drawings described briefly above. Various modifications to the example embodiments may be contemplated by one of skill in the art.

As used herein, unless otherwise limited or modified, lists with elements separated by "and" that are preceded by the phrase "one or more of" or "at least one of" indicate configurations or arrangements that potentially include individual elements of the list, or any combination thereof. For example, "at least one of A, B, and C" or "one or more of A, B, and C" can indicate only A, only B, only C, or any combination of two or more of A, B, and C (e.g., A and B; B and C; A and C; or A, B, and C).

In the following description, terms of direction and orientation, such as "forward," "rearward," "left," "right," and "lateral" may be used. Such terms are defined, at least in part, with respect to the heading orientation of the work vehicle. As appearing herein, the term "forward" and the abbreviated term "fore" refer to a direction corresponding to the travel direction of the work, while the term "aft" refers to an opposing direction. The terms "lateral" or "left" and "right" refer to directions or sides of the work vehicle that are generally orthogonal to its heading. The terms "vertical" and "horizontal" refer to the direction or orientation with respect to horizon or environmental space in which the work vehicle resides. As used herein, these terms need not define an absolute direction or orientation, but rather may be construed to reference general relative directions or orientations similar to, but not precisely, parallel or perpendicular to the horizon.

Generally, work vehicles, such as those in the agriculture, construction, forestry and mining industries, may be large, high-power machines, which in some cases have large-diameter wheels providing high ground clearance and operator visibility of the ground being worked. In such work vehicles, various areas of the machine that must be accessed by humans (e.g., the operator cabin or engine or other compartments) for operation or service and maintenance of the work vehicle are elevated significantly from the ground. To access these areas, various platforms or steps have been added to the work vehicles.

Yet, some conventional machines have steps that are not ergonomically located and may be awkward to use (e.g., steps that are too high off the ground, have too great of a rise between steps, or create pinch points for hands and feet), or are sized and arranged in ways that interfere with the functionality of the work vehicle (e.g., interfere with ground clearance or transport on roadways). Further, various human factor and vehicle width and height regulations may mandate or restrict stairs of certain configurations and locations on the vehicle.

This disclosure provides an improved stair assembly for a work vehicle having one or more steps. Generally, the stair assembly may be configured and located on the vehicle to comply with various human factor and vehicle sizing requirements applicable to such work vehicles. The stair assembly thus provides a more comfortable ingress to and egress from the machine for the operator or service technician within proper vehicle size parameters without impeding the functionality of the work vehicle.

In certain embodiments, the stair assembly is movable to extend and retract into multiple positions. The stair assembly is useable for ingress/egress in at least one orientation, namely at least one extended orientation. However, the stair assembly may also be usable for ingress/egress in one or more of other multiple extended orientations and/or in one or more retracted orientations. Thus, the stair assembly of this disclosure may be a multi-position stair assembly for use with work vehicles that may be used to board or alight from the vehicle in one or more configurations.

In certain embodiments, the stair assembly is configured to take an extended orientation that puts a first step lower to the ground and further outward from a side of the work vehicle than it is when in one or more retracted orientations (e.g., a fully retracted orientation in which the stair assembly stores compactly alongside the work vehicle). In the extended orientation, the stair assembly provides comfortably spaced steps at a moderate rise and angle of extension, for easy ingress/egress from/to the work vehicle. In other embodiments, the stair assembly may provide comfortably spaced steps albeit at a somewhat shorter rise and steeper angle. In both retracted and extended orientations then, the stair assembly may be configured to provide steps that are separated by a substantially consistent, evenly-spaced rise, only that the rise dimension and angle of extension differs in the different orientations.

In certain embodiments, the stair assembly may be configured to change between retracted and extended orientations by a combination of pivoting and translating motion. For example, as the stair assembly moves from the retracted orientation it may pivot outward and lengthen until it reaches the extended orientation. To retract, the stair assembly may move in reverse, that is, pivot inward and shorten. Various mechanisms and configurations may be used to effect the change in length of the stair assembly. For example, individual sets of support members or columns that support individual steps may slide relative to one another. In some embodiments, the support members may be hollow (e.g., tubular and so on) and may nest within one another. The nested step support members may be configured to telescope relatively into and out of one another. Various tracks or stop mechanisms may be used to ensure substantially even rise dimensions between steps in each of the different orientations of the stair assembly.

In still other embodiments, the stair assembly may include a stepped support structure providing the one or more steps and which is moved by an actuator. The actuator may be a mechanical, hydraulic and/or electric assembly configured to impart motion to the stepped support. For example, the actuator may include an electric or hydraulic motor and an extender assembly with one or more rails that move relative to one another and effect movement of the stepped support. The stepped support may be pivotally mounted (directly or indirectly) to the work vehicle and include an assembly of relatively moveable step sections, in which case operation of the actuator may drive the extender assembly to pivot the stepped support and relatively separate or bring together the individual step sections as needed to move between the extended and retracted orientations.

In yet other embodiments, the stair assembly may be operated automatically, semi-automatically or manually under power. For example, an electronic, hydraulic or electro-hydraulic control system may be incorporated into the work vehicle to extend and retract the stair assembly. The control system may receive operator inputs (e.g., from one or more controls in the operator cabin) to operate the actuator in either direction to extend or retract the stair assembly fully or in one or more partially extended or retracted orientations. Alternatively or additionally, the various sensors may be incorporated into the control system to provide inputs to the one or more controllers. By way of example, the various sensors may indicate an operational state of the work vehicle, which the controller(s) use to actuate the stair assembly. The sensor(s), for example, may indicate that the transmission of the work vehicle is in a "park" mode (i.e., stationary), in which case the controller(s) may cause the actuator to move the stair assembly into the extended orientation without intervention from the operator. The sensor(s) may also indicate that the transmission is in any of a various range gear modes (i.e., moving or potentially moving) in which the controller(s) may cause the actuator to automatically retract the stair assembly.

Referring now to the drawings, an example work vehicle stair assembly will be described in detail. As will become apparent from the discussion herein, the disclosed stair assembly may be used advantageously in a variety of settings and with a variety of machinery. For example, referring now to FIG. 1, the disclosed stair assembly may be included in a work vehicle 10, which is depicted as an agricultural tractor. It will be understood, however, that other configurations may be possible, including configurations with work vehicle 10 as a different kind of tractor, or as a work vehicle used for other aspects of the agriculture industry or for the construction and forestry industries (e.g., a harvester, a log skidder, a motor grader, and so on). It will further be understood that the disclosed stair assembly may also be used in non-work vehicles and non-vehicle applications (e.g., fixed-location installations).

As is known, the work vehicle 10 has a main frame or chassis 12 supported off of the ground "G" by ground-engaging wheels 14, at least the front wheels of which are steerable. The chassis 12 supports a power plant 16 (e.g., internal combustion engine), a transmission 18, and an operator cabin 20 perched up from the middle to rear of the machine in which an operator seat 22 and operator interface and controls 24 are stationed for operation of the work vehicle 10. The operator controls 24 may be configured in a variety of ways, for example as one or more joysticks, various switches or levers, one or more buttons, a touchscreen interface that may be overlaid on a display, a keyboard, a speaker, a microphone associated with a speech recognition system, or various other human-machine interface devices. One or more cab doors 26 provide ingress to and egress from the operator cabin 20 at one or both sides of the work vehicle 10. A stair assembly 30 in accordance with this disclosure is mounted to one side (or both sides) of the work vehicle 10 beneath the (one or more) cab doors 26 to aid in the operator boarding and alighting the work vehicle 10.

The example stair assembly 30 is illustrated in the drawings, in whole or in part, in a fully retracted orientation in FIGS. 2, 4, 6 and 8 and in a fully extended orientation in FIGS. 3, 5, 7 and 9. This example configuration and the example fully retracted and extended orientations, are not limiting, as other configurations and other retracted/extended orientations may be possible. Further, although not shown, one or more intermediate orientations between the retracted and extended orientations depicted may also be possible.

Specifically now, the example stair assembly 30 includes as major components a stepped support 40 and an actuator 70. The stepped support 40 may be manufactured in a variety of manners. In the illustrated example, the stepped support 40 has a plurality of step sections, in particular four step sections 42a-42d, each having a pair of generally upright, fore-aft spaced-apart columns 44 to which a step 46 is mounted in a suitable rigid manner (e.g., integrally formed, press-fit, weld, mechanical fasteners, etc.). The steps 46 may by monolithic structures or assemblies and solid or containing one or more open areas.

The step sections 42a-42d are configured to move with respect to one another so that the stair assembly 30 may be converted between the retracted and extended orientations. The mechanics of retracting and extending the step sections 42a-42d may vary and be of any suitable arrangement to effect the desired movements of the stair assembly 30, including providing a change in position of a lowest step relative to the work vehicle 10 and the ground G as well as the change in overall length of the stair assembly 30 in the retracted and extended orientations. Hinging and relative sliding of the step sections in a variety of ways is thus contemplated. In the illustrated example, the step sections 42a-42d are configured for telescoping movement. To facilitate telescoping movement of the step sections 42a-42d, the columns 44 may be tubes, slats or other elongated bodies that slidably engage one another to collapse the stepped support 40 when in the retracted orientation, and lengthen the stepped support 40 when in the extended orientation. In the illustrated example, the columns 44 are generally rectangular tubes of incrementally varying cross-sectional dimension to permit nesting of the columns 44. For example, the relatively lower column of an adjacent pair of columns may be of lesser cross-sectional dimension so as to slide into (or nest within) the hollow interior of the other, larger cross-sectioned column. However, the nested arrangement and the depicted tubular configuration (i.e., shape, size, and materials) of the columns 44 may vary.

By way of example, the columns 44 of step sections 42a-42c may each include an elongated slot 48, and the columns 44 of step sections 42b-42d may each include a projecting member sized to fit within the associated slots 48. The projecting member may be of any suitable construction, including and a rigid pin integrally connected (e.g., formed or welded) to the associated column, or as a bolt (and nut) arrangement 50 that mounts to the associated column. In the case of threaded bolt configuration, a non-threaded section of the shank or a glide sleeve (not shown) may be provided to facilitate relative sliding in the slot. Such a sleeve may also act to tighten the sliding connection if larger tolerances are used in the relative sizing of the columns 44. A single pin/bolt and slot connection (rather than two as shown) may be used for each adjacent pair of step sections, and other groove and projection configurations (e.g., sliding rails, sliding detents, etc.) may be employed. Further, since the lowest step section 42d does not attach another step section, it need not be, and is not, slotted, and since the uppermost step section 42a does not attach another step section, it need not, and does not, include pins or bolts. It will also be understood that the pin/bolt and slots may be reversed so that the slots are in the relatively inner columns and the pins/bolts on the relatively outer columns.

Referring also to FIGS. 8 and 9, the uppermost step section 42a does not attach to another step section of similar configuration, but rather attaches to a fixed platform 52, and thereby mounts the stepped support 40 to the work vehicle 10. The fixed platform 52 may be configured and arranged to be substantially parallel to the chassis 12 of the work vehicle 10 and sized to support a standing operator or technician. Like the steps 46, the fixed platform 52 may be monolithic or an assembly and be solid or perforated. The mechanism for coupling the stepped support 40 to the fixed platform 52 (and thereby the work vehicle 10) may vary. In the illustrated example, the connection causes both pivotal and translatory motion. Specifically, a pivot connection 54 is provided along a pivot axis "A" at an outer end of the fixed platform 52. The pivot connection 54 is defined by projecting members (e.g., pins or bolts 50) mounted in openings defined in tabs 58 extending below the outer edge of the fixed platform 52. The bolts 50 fit through slots 60 in gussets 62 extending from the upper end of the uppermost step section 42a. Thus, the stepped support 40 slides and pivots relative to the fixed platform 52 as it moves between retracted and extended orientations. To accommodate the gussets 62, the fixed platform 52 has slits 64 through which the gussets 62 pass when the stair assembly 30 is retracted.

Additionally, the stair assembly 30 may include a rail member for the operator or technician to grasp when climbing or descending stair assembly 30. While various configurations are possible, in the illustrated example the stair assembly 30 includes a large handrail 68 that couples to the stepped support 40, for example to one side of the uppermost step section 42a, via any suitable technique (e.g., weld, mechanical fasteners, etc.). By attaching the handrail 68 to the stepped support 40, and in particular to the uppermost step section 42*a*, the handrail 68 will move with the stepped support 40 as the stair assembly is retracted and extended, and thus be in a usable orientation for being grasped by the operator or technician when climbing or descending the stair assembly 30 in either the extended or retracted orientation. The handrail 68 may be formed as a single bent metal bar, as illustrated, or be of other one-piece or multi-piece configurations and constructions.

The movement of the stair assembly 30 between retracted and extended orientations may be effected in numerous ways, including manually and various power-assisted (i.e., automated and semi-automated) methods. Further, various mechanisms for effecting the power-assisted retraction and extension of the stair assembly may be employed, including using an actuator driven by electric or hydraulic power generated on-board the work vehicle 10. For example, the actuator may include one or more of a hydraulic cylinder, a pneumatic cylinder, a hydraulic motor, an electronic motor, a drive screw, or any similar device suitable to perform the movement described herein. In particular, the actuator 70 of the stair assembly 30 includes a drive unit 72 (e.g., an electric or hydraulic drive) which imparts rotational input (e.g., via a drive screw) to an extender assembly 74, which has a plurality of interconnected drive rails 76 (e.g., two shown in the illustrated example). Like the columns 44, the drive rails 76 may have various solid or hollow configurations, and like the columns 44, the drive rails 76 may be configured to slide relative to one another in a nested telescoping arrangement. The actuator 70 mounts at one end (e.g., via a pivot connection 78*a*) to the work vehicle 10 and the lower drive rail 76 connects to the stair assembly 30 (e.g., via a pivot connection 78*b*). Powering the drive unit 72 in one direction thus causes the drive rails 76 of the extender 74 to extend, and reversing the drive unit 72 causes the extender to collapse. This movement in turn causes the stepped support 40 to pivot about the pivot axis A, while simultaneously the step sections 42*a*-42*d* translate (via the associated pin and slot connections) to shorten and lengthen the stair assembly 30 as it moves between the retracted and extended orientations.

The actuator 70, and thereby the stair assembly 30, may be responsive to a control system having one or more controllers (e.g., controller 80) configured to processes various algorithms and inputs. As is understood in the art, the controller(s) may be configured as computing devices with associated processor devices and memory architectures, as a hard-wired computing circuit (or circuits), as a programmable circuit, as a hydraulic, electrical or electro-hydraulic controller, or otherwise. As such, the controller(s) may be configured to execute various computational and control functionality with respect to the work vehicle 10. In some embodiments, the controller(s) may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller(s) may be configured as an assembly of hydraulic components (e.g., flow lines, pistons/cylinders and/or valves 82), such that control of various devices (e.g., pumps or motors 84) may be effected with, and based upon, hydraulic, mechanical, or other signals and movements. The controller may be in electronic, hydraulic, mechanical, or other communication with various other systems or devices of the work vehicle 10. For example, the controller 80 may be in electronic or hydraulic communication with various actuators, sensors, and other devices within (or outside of) the work vehicle 10, including various devices associated with the pumps, control valves, and so on. The controller 80 may communicate with other systems or devices (including other controllers) in various known ways, including via a CAN bus (not shown) of the work vehicle 10, via wireless or hydraulic communication means, or otherwise onboard the work vehicle 10, or at various remote locations.

Various sensors may also be provided to observe various conditions associated with the work vehicle 10. In some embodiments, various sensors (e.g., pressure, flow or other sensors) may be disposed near the pumps and control valves, or elsewhere on the work vehicle 10 or its implements. For example, various sensors, such as additional sensors 86, 88, may also be disposed on or near the operator seat 22 and the stair assembly 30. In some embodiments, the sensors 86, 88 may include one or more pressure sensors that observe a pressure indicative of the operator seat 22 being occupied or vacated, or within the hydraulic circuit, such as a pressure associated with the transmission 18 or with the pumps or motors 84. The sensors 86, 88 may also include angle sensors to detect rotational angle orientations of the stepped support 40, linear sensors to detect the "length" of the stepped support 40, or inertial measurement units (IMUs) or microelectromechanical sensors (MEMs) that observe a force of gravity and an acceleration associated with the stair assembly 30. Each of the sensors 86, 88, as well as the drive unit 72 of the actuator 70, may be in communication with the controller 80 via suitable communication architecture.

As noted, the actuator 70 may be responsive to the control system (via controller 80) to control operation of the stair assembly 30. For example, in a semi-automated or power-assist mode, an input of the operator controls 24 may be used to command the controller 80 to drive the drive unit 72 in either direction to retract or extend the stepped support 40. The controller 80 may monitor feedback signals from the sensors 86, 88 to determine a current orientation of the stepped support 40, which the controller 80 may use in making the re-orientation adjustments to ascertain when full extension or retraction is reached or to set the stair assembly 30 at an intermediate orientation. Note that mechanical stops are provided by the pin and slot connection of the step sections 42*a*-42*d* when the bolts 50 contact the ends of the slots 48.

In other embodiments, a more fully automated mode of the control system may control positioning of the stair assembly 30 based on one or more determinations made of the vehicle state based on sensor input. For example, the controller 80 may process input signals from the sensors 86, 88 that indicate the state of motion (e.g., moving or stopped, or within a certain speed band or transmission range). The control system may thus, for example, automatically extend the stair assembly 30 when the vehicle is in "park" or the ignition is off, and automatically retract the stair assembly 30 when the work vehicle 10 is in motion or reached a specified speed or transmission gear.

Alternatively or additionally, the control system may also control the stair assembly 30 based on the state or condition of other vehicle components or sub-systems. For example, the controller 80 may process input signals from the sensors 86, 88 indicating that the operator seat 22 is vacant in which case the control system may automatically extend the stair assembly 30, possibly only after first determining that the sensor indications are satisfied, such as the vehicle being parked. Other example control logic may be employed to control the orientation of the stair assembly 30 in a more automated fashion.

Referring now to FIGS. 1, 2, 4 and 6, when in the fully retracted orientation, the stepped support assumes its minimized length (by collapsing the step sections 42a-42d together) and the lowest step of the stair assembly 30 is positioned at a first height $H_R$ above the ground G. The angle of retraction $\theta_R$ (measured as the included angle between the fixed platform 52 (or horizontal on level ground) and an edge or centerline of the columns 44 of the stepped support 40) gives the stair assembly 30 an inward raised position, near vertical and generally parallel to and tucked along of side of the work vehicle 10. In the illustrated example shown in FIG. 4, the angle of retraction $\theta_R$ is about 95-105 degrees, giving the stair assembly 30 about a 10 degree upward slope (or angle of inclination) relative to the vehicle chassis 12 (or the horizontal if on level ground). As some markets have width restraints on the overall width of certain work vehicles, the lateral space occupied is minimal in order to comply with the certain of such maximum width requirements (e.g., 2.55 meters).

Figure 3:
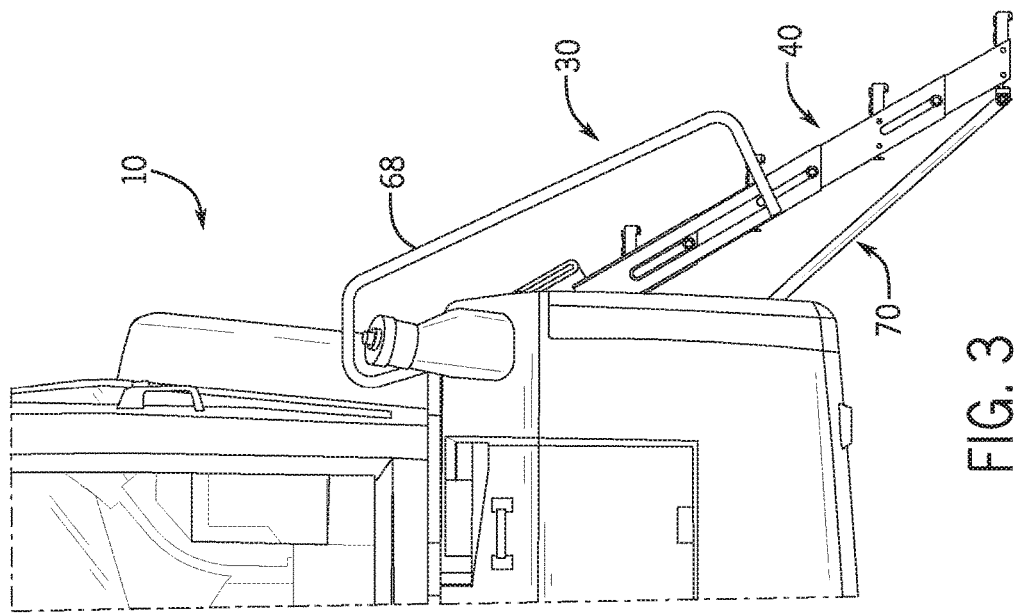
FIGS. 2 and 3 are partial perspective views of a portion of a work vehicle, as viewed from the front, showing the stair assembly in retracted and extended orientations, respectively.
Figure 2:
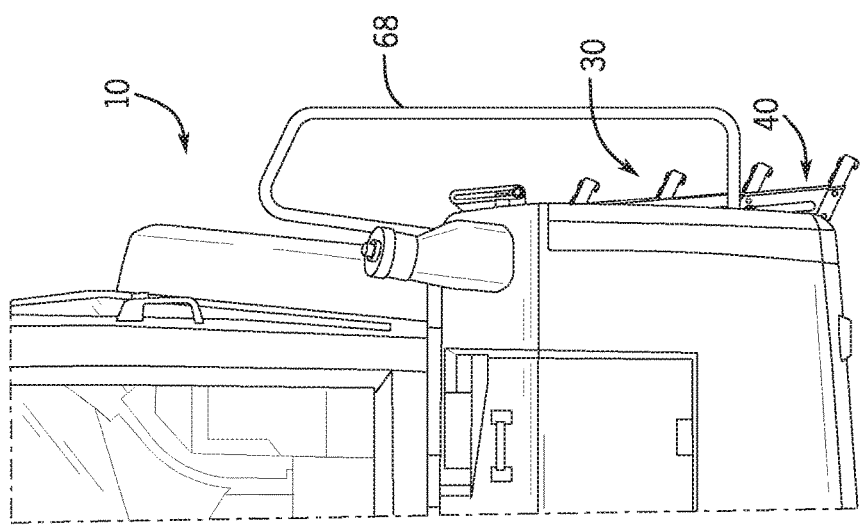

When in the fully extended orientation, shown in FIGS. 3, 5, 7, the stepped support 40 lengthens (by moving the step sections 42a-42d apart) and the angle of extension $\theta_E$ (measured from the fixed platform 52 or horizontal) of the stair assembly 30 brings the stepped support 40 into an outward, lowered position. In the illustrated example shown in FIG. 5, the angle of extension $\theta_E$ is about 110-115 degrees, giving the stair assembly 30 about a 65-70 degree upward slope (or angle of inclination) relative to the vehicle chassis 12 (or the horizontal if on level ground). The angulation of the steps 46 with respect to the columns 44 is set so that the steps 46 are substantially parallel to the chassis 12 of the work vehicle 10 (or horizontal on level ground) when in the extended orientation. Moreover, the lowest step of the stair assembly 30 when in the extended orientation, as shown in FIG. 5, is at a second height $H_E$ above the ground G, which is lower than the first height $H_R$. In one example, the lowest step may have an $H_R$ of about 625-650 mm and an $H_E$ of about 250-275 mm thus providing a comfortable first step height at least when the stair assembly 30 is extended and a good ground clearance at least when it is retracted.

Moreover, in at least both the retracted and extended orientations, the steps 46 are spaced a substantially equal distance from each other, the spacing being slightly greater in the extended orientation than in the retracted orientation. Referring to FIG. 6, the steps 46 are arranged such that consecutive steps are separated by substantially a first step rise $R_R$ in the retracted orientation. Referring to FIG. 7, in the extended orientation, the steps 46 are arranged such that consecutive steps are separated by substantially a second step rise $R_E$, which may be larger than the first step rise $R_R$. The first step rise $R_R$ and second step rise $R_E$ may each correspond to a minimum foot pinch clearance distance, for example, of at least 120 mm. The steps 46 may also be separated by a suitable clearance distance for other body extremities, for example, of at least 100 mm corresponding to an arm pinch clearance. Furthermore, the vertical spacing between the fixed platform 52 and the uppermost step may also provide for a minimum body extremity clearance, which in the extended orientation may be substantially the same as the second step rise $R_E$. The stair assembly 30 thus provides a consistent step rise for the lowest step 46 of step section 42d to the fixed platform 52.

Thus, there has been described one or more example embodiments of a stair assembly for a work vehicle having a stepped support and an actuator. The stepped support is moveable by the actuator between a retracted orientation, in which the stepped support is shortened, raised and compactly stowed at the side of the machine, and an extended orientation, in which the stepped support is lengthened and swung out from the machine and lowered toward the ground. Various example power-assist control schemes for automated actuation of the stair assembly have also be described.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, depending on the context, words such as "connect," "coupling," or "coupled to" used in describing a relationship between different elements do not imply that a direct physical connection must be made between these elements. For example, two elements may be connected to each other physically, electronically, logically, or in any other manner, through one or more additional elements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A stair assembly for a work vehicle, comprising:
a stepped support having a plurality of steps and configured to be mounted at a first end to a side of the work vehicle, the stepped support being moveable between a retracted orientation, in which the stepped support has a first length between the first end and a second end, and an extended orientation, in which the stepped support has a second length between the first and second ends that is greater than the first length, the second end being lower than the first end in the retracted orientation and the extended orientation; and
an actuator coupled to the stepped support and configured to move the stepped support between the retracted and extended orientations;
wherein, when the stepped support is mounted to the work vehicle, the second end of the stepped support is at an outward lowered position in the extended orientation with respect to the work vehicle relative to an inward raised position of the second end of the stepped support in the retracted orientation;
wherein the plurality of steps is mounted to the stepped support such that all consecutive steps of the plurality of steps are separated by substantially (i) a first step rise when the stepped support is in the retracted orientation, and (ii) a second step rise that is larger than the first step rise when the stepped support is in the extended orientation; and wherein, when the stepped support is mounted to the work vehicle, the plurality of steps is operable for ingress to and egress from the work vehicle in the extended orientation and the retracted orientation.

2. The stair assembly of claim 1, wherein, when the stepped support is mounted to the work vehicle, the plurality of steps is configured to be substantially parallel to a chassis of the work vehicle in the extended orientation of the stepped support.

3. The stair assembly of claim 1, wherein the actuator is configured to pivot and translate the stepped support when moving between the retracted and extended orientations.

4. The stair assembly of claim 3, further including:
a step platform attached to the stepped support at the first end; and
a pivot connection between the step platform and the first end of the stepped support.

5. The stair assembly of claim 1, wherein, when the stepped support is mounted to the work vehicle, the actuator device is coupled to the work vehicle by a pivot connection.

6. The stair assembly of claim 5, wherein the actuator is one of an electric actuator and a hydraulic actuator.

7. The stair assembly of claim 6, wherein the actuator moves the stepped support to the retracted orientation in response to input that the work vehicle is moving; and
wherein the actuator moves the stepped support to the extended orientation in response to input that the work vehicle is stationary and an operator seat of the work vehicle is unoccupied.

8. The stair assembly of claim 1, wherein the stepped support includes at least one pair of spaced apart columns to which the plurality of steps is mounted.

9. The stair assembly of claim 8, wherein there are a plurality of pairs of columns, each of the plurality of steps being mounted to one of the plurality of pairs of columns; and
wherein each pair of columns is movable relative to the other pairs of columns.

10. The stair assembly of claim 9, wherein the pairs of columns include a relatively sliding stop configured to space apart the plurality of steps at the first step rise when the stepped support is in the retracted orientation and at the second step rise when the stepped support is in the extended orientation.

11. The stair assembly of claim 10, wherein the actuator includes an extender assembly having drive rails configured to slide relative to another.

12. A stair assembly for a work vehicle, comprising:
a stepped support having a plurality of steps and configured to be mounted at a first end to a side of the work vehicle, the stepped support being moveable between a retracted orientation, in which the stepped support has a first length between the first end and a second end, and an extended orientation, in which the stepped support has a second length between the first and second ends that is greater than the first length, the second end being lower than the first end in the retracted orientation and the extended orientation; and
an actuator coupled to the stepped support and configured to move the stepped support between the retracted and extended orientations;
wherein, when the stepped support is mounted to the work vehicle, the second end of the stepped support is at an outward lowered position in the extended orientation with respect to the work vehicle relative to an inward raised position of the second end of the stepped support in the retracted orientation; and wherein the plurality of steps is mounted to the stepped support such that all consecutive steps are separated by substantially (i) a first step rise when the stepped support is in the retracted orientation, and (ii) a second step rise that is larger than the first step rise when the stepped support is in the extended orientation; and
wherein, when the stepped support is mounted to the work vehicle, the plurality of steps is operable for ingress to and egress from the work vehicle in the extended orientation and the retracted orientation.

13. The stair assembly of claim 12, further including a platform to which the stepped support is pivotally coupled at the first end.

14. The stair assembly of claim 12, wherein the actuator is one of an electric actuator and a hydraulic actuator; and
wherein the actuator moves the stepped support to the retracted orientation in response to input that the work vehicle is moving and moves the stepped support to the extended orientation in response to input that the work vehicle is stationary and an operator seat of the work vehicle is unoccupied.

15. The stair assembly of claim 12, wherein there are a plurality of pairs of columns, each of the plurality of steps being mounted to one of the plurality of pairs of columns; and
wherein each pair of columns is movable relative to the other pairs of columns.

16. The stair assembly of claim 15, wherein one or more of the pairs of columns is configured to telescope within an adjacent pair of columns; and
wherein the pairs of columns include a relatively sliding stop configured to space apart the plurality of steps at the first step rise when the stepped support is in the retracted orientation and at the second step rise when the stepped support is in the extended orientation.

17. A work vehicle, comprising:
a chassis supported by ground-engaging wheels or tracks;
an operator cabin supported by the chassis; and
a stair assembly for operator ingress to and egress from the operator cabin, the stair assembly including:
a stepped support having a plurality of steps and pivotally mounted at a first end to a side of the work vehicle, the stepped support being moveable between a retracted orientation, in which the stepped support has a first length between the first end and a second end, and an extended orientation, in which the stepped support has a second length between the first and second ends that is greater than the first length, the second end being lower than the first end in the retracted orientation and the extended orientation; and
an actuator coupled to the stepped support and the work vehicle and configured to pivot and translate the stepped support between the retracted and extended orientations;
wherein the second end of the stepped support is at an outward lowered position in the extended orientation with respect to the work vehicle relative to an inward raised position of the second end of the stepped support in the retracted orientation;
wherein all consecutive steps of the plurality of steps are separated by substantially (i) a first step rise when the stepped support is in the retracted orientation, and (ii) a second step rise that is larger than the first step rise when the stepped support is in the extended orientation; and wherein the plurality of steps is operable for ingress to and egress from the work vehicle in the extended orientation and the retracted orientation.

18. The work vehicle of claim 17, wherein the actuator is one of an electric actuator and a hydraulic actuator; and
wherein the actuator moves the stepped support to the retracted orientation in response to input that the work vehicle is moving and moves the stepped support to the extended orientation in response to input that the work vehicle is stationary and an operator seat of the work vehicle is unoccupied.

19. The work vehicle of claim 17, wherein there are a plurality of pairs of columns, each of the plurality of steps being mounted to one of the plurality of pairs of columns; and
wherein each pair of columns is movable relative to the other pairs of columns and configured to space apart the plurality of steps at the first step rise when the stepped support is in the retracted orientation and at the second step rise when the stepped support is in the extended orientation.

\* \* \* \* \*